Nov. 2, 1926.   1,605,020
J. L. WOODBRIDGE
GAS RESPONSIVE MEANS FOR CHARGING STORAGE BATTERIES AND THE LIKE
Filed July 21, 1924   3 Sheets-Sheet 1

WITNESS:

INVENTOR
Joseph Lester Woodridge
BY
Augustus B. Stoughton
ATTORNEY.

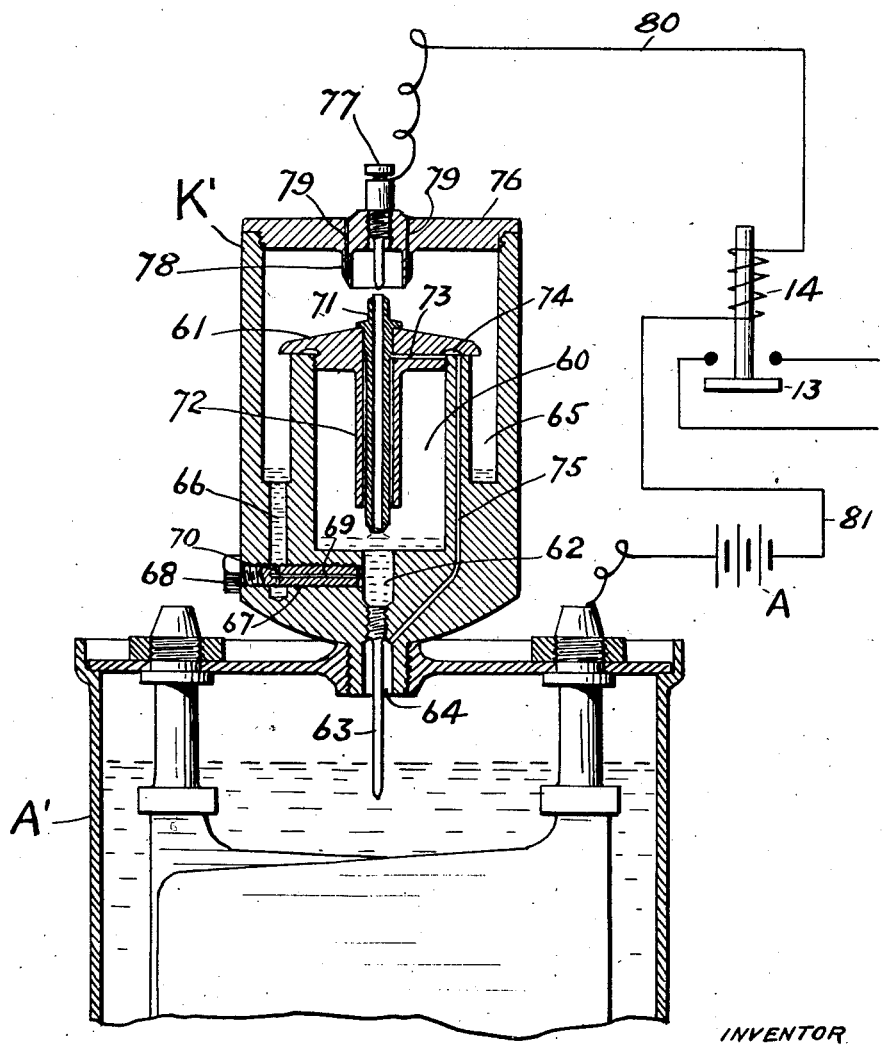

Patented Nov. 2, 1926.

1,605,020

UNITED STATES PATENT OFFICE.

JOSEPH LESTER WOODBRIDGE, OF PHILADELPHIA, PENNSYLVANIA.

GAS-RESPONSIVE MEANS FOR CHARGING STORAGE BATTERIES AND THE LIKE.

Application filed July 21, 1924. Serial No. 727,350.

This application is a continuation in part of my application, Serial No. 324,511, filed September 18, 1918.

My invention relates to means responsive to the evolution of gas and useful for controlling the charging current of a storage battery.

One object of the invention is to provide simple, reliable and inexpensive means responsive to the rate at which gas is evolved, for example, from one of the cells, or to the pressure produced by the gas, and useful for controlling the charging current of the battery.

It is well known that as the charging of a storage battery progresses a certain amount of oxygen and hydrogren are evolved and the rate at which these gases are produced increases toward the end of the charge if a constant charging rate is maintained. The rate of gas evolution may be reduced by reducing the charging current and it is generally desirable in charging a storage battery to avoid excessive gassing by reducing the charging rate from time to time as the charge progresses; or if a low charging rate is used throughout the entire charge, it may be desirable to maintain this rate constant until the evolution of gas becomes sufficiently rapid and then to interrupt the charging current entirely.

During the earlier part of the charge a certain amount of gas will be evolved at a low rate, which is not objectionable, and in any apparatus designed to control the charging current in response to gas evolution means must be provided for allowing this small amount of gas to escape without actuating the controlling means. In the apparatus heretofore proposed for accomplishing these results, this small amount of gas has been allowed to escape through a minute orifice so small that as soon as gas is evolved in any appreciable quantity the back pressure due to the resistance of the small orifice would cause an increase of gas pressure in the cell, and this increase of gas pressure was relied upon to control the charging current through suitable actuating means. A difficulty arises in the operation of apparatus designed in this way due to the fact that, in order to create an appreciable back pressure the orifice must be made exceedingly small and this orifice is then liable to become choked with a particle of foreign material or even with a drop of spray from the cell or a drop of condensed moisture, and the slightest obstruction of this kind will stop the escape of gas and increase the gas pressure in the cell to a point sufficient to operate the controlling apparatus long before that state of charge is reached at which this apparatus should be caused to operate, thus introducing an element of unreliability which is highly undesirable.

In charging apparatus designed in accordance with my invention I have overcome this difficulty by dispensing with this minute gas outlet and providing a liquid outlet or by-pass and utilizing the resistance to the flow of the liquid through this outlet as will hereinafter be more fully described.

My invention will be more clearly understood by reference to the following description in connection with the accompanying drawings forming part hereof and in which—

Fig. 3 is a similar view of a modification of the gas responsive means.

Figure 1:
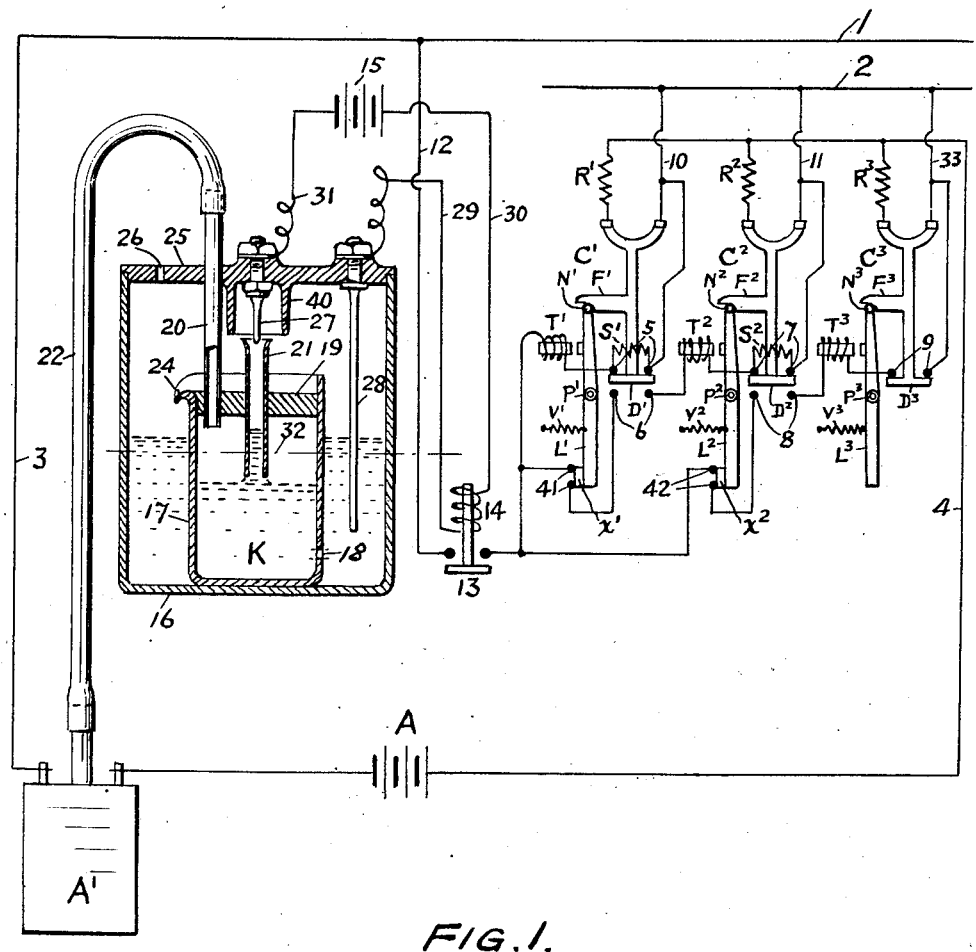
Figure 1 is a view, partly in section of apparatus, and partly diagrammatic of circuit connections involving features of the invention and designed to vary the charging current of a storage battery in three steps by means of automatically controlled circuit breakers.

Referring more particularly to Fig. 1, A is a storage battery of which one cell $A^1$ is shown to an enlarged scale and in some detail. The battery is connected across the charging circuit 1—2 by means of conductors 3—4. Between conductor 4 and conductor 2 are connected three resistors $R^1$, $R^2$ and $R^3$ in parallel relation. These resistors are connected in circuit respectively by means of circuit breakers $C^1$ $C^2$ and $C^3$ and conductors 10, 11 and 33. The construction of the circuit breaker $C^1$ will now be described, the other two circuit breakers are similar and their corresponding parts will be given the same reference letters but with appropriate exponents. A laterally projecting arm $F^1$ resting on a pin $N^1$ holds the circuit breaker in the closed position. The pin $N^1$ is mount-

the column of liquid in tube 21 upward and out of the tube, when it will fall back on the surface of the stopper 19 and be drained off by the lip 24. As soon as the column of liquid has been forced out of tube 21, the gas pressure in the top of vessel 17 will be relieved and the accumulation of gas will pass off through tube 21 and out through the orifice 26 in the cover of the vessel 16. The gas pressure being relieved, the liquid will be forced back from the vessel 16 into vessel 17 through the orifice 18 by reason of the difference in head of the liquid in the two vessels until the level in the vessel 17 rises to a point where the lower end of tube 21 is again closed. Further accumulation of gas pressure will then force another column of liquid up into tube 21 and the cycle will be repeated.

So long as the evolution of gas from the cell $A^1$ is comparatively slow the level of the liquid in tube 21 and in the outer vessel 16 will be approximately the same, since there is free communication between the two bodies of liquid through the orifice 18 and the upper end of the tube 21 communicates freely with the space over the liquid in vessel 16. The quantity of liquid in the vessels and the dimensions of the latter should be such that under these conditions as the gas pressure slowly increases, a sufficient quantity of liquid is forced out of the vessel 17, through orifice 18 to break the column of liquid at the bottom of tube 21 before the column rises sufficiently to make contact at the top with the terminal 27. If, however, the evolution of gas in cell $A^1$ is sufficiently rapid, the liquid will not be able to pass through the small orifice 18 fast enough to maintain equilibrium, but considerable back pressure will be developed at this point, causing the column of liquid in tube 21 to rise to a higher level than the surface of the liquid in vessel 16.

The more rapid the development of gas in cell $A^1$ becomes the greater will be this difference of level and the apparatus may be so designed that with a given rate of evolution of gas in the cell $A^1$, the column of liquid in tube 21 will rise to a sufficient height to make contact at its upper surface with terminal 27 before the column is broken at the lower end of the tube. When this occurs the circuit of the exciting coil 14 will be closed by reason of the continuous body of conducting liquid between terminals 27 and 28 through orifice 18 and the column of liquid in tube 21, and the relay 13 will make contact, thereby permitting current to pass through trip coil $T^1$ and tripping open the circuit breaker $C^1$. This will cut out of circuit resistor $R^1$ and reduce the charging current passing through the battery A. On account of this reduction in charging current the rate of evolution of gas in cell $A^1$ will be reduced but the battery will continue to charge at the lower rate.

When the circuit breaker $C^1$ is tripped, as described above, by the movement of the lever $L^1$, caused by the attraction of the solenoid $T^1$, the lower end of the lever is moved to the right thus opening the contacts at 41. The opening of the circuit breaker will also open the contacts at 5, thus introducing the resistance $S^1$ in series with the solenoid $T^1$. The resistance $S^1$ is so designed that the reduced value of the current in solenoid $T^1$ with the resistance $S^1$ in circuit, while insufficient to start the motion of lever $L^1$ against the tension of spring $V^1$, will still be sufficient to hold the lever in the open position after it has been drawn over, on account of the reduction in the air gap of the solenoid $T^1$, so that the closing of the contacts 6 by reason of the opening of circuit breaker $C^1$, will not close the circuit of the solenoid $T^2$ until the contacts at 41 are again closed. This will only occur when the relay 13 opens upon the opening of the circuit in the device K, by the breaking of the column of liquid in the tube 21 at its lower end. When this occurs and the relay 13 opens, the lever $L^1$ will be released and the contacts restored at 41. The relay 13 now being open, no current will flow through the solenoid $T^2$ until a further increase in the rate of gas evolution occurs in the cell $A^1$ sufficient to re-establish the circuit in the apparatus K, as described above. When this occurs, the relay 13 will again close, this time tripping circuit breaker $C^2$ and opening the circuit of resistor $R^2$, causing a further reduction in the charging current of the battery. When the rate of gas evolution again rises in the cell $A^1$, the circuit breaker $C^3$ will be tripped open, thus breaking the charging circuit entirely and cutting off the charge.

It will be seen that the apparatus above described provides means for controlling the charging current of the battery in response to the rate of evolution of gas and the accumulation of gas pressure in the cell $A^1$, and it will further be evident that the tube 21 is a controlling element in which liquid rises in response to gaseous pressure and the orifice 18 is a relatively restricted liquid outlet which limits the rise of liquid in the element 21 at low rate of gas production. Hence the invention is not limited to the particular embodiment of those elements shown and described.

Figure 2:
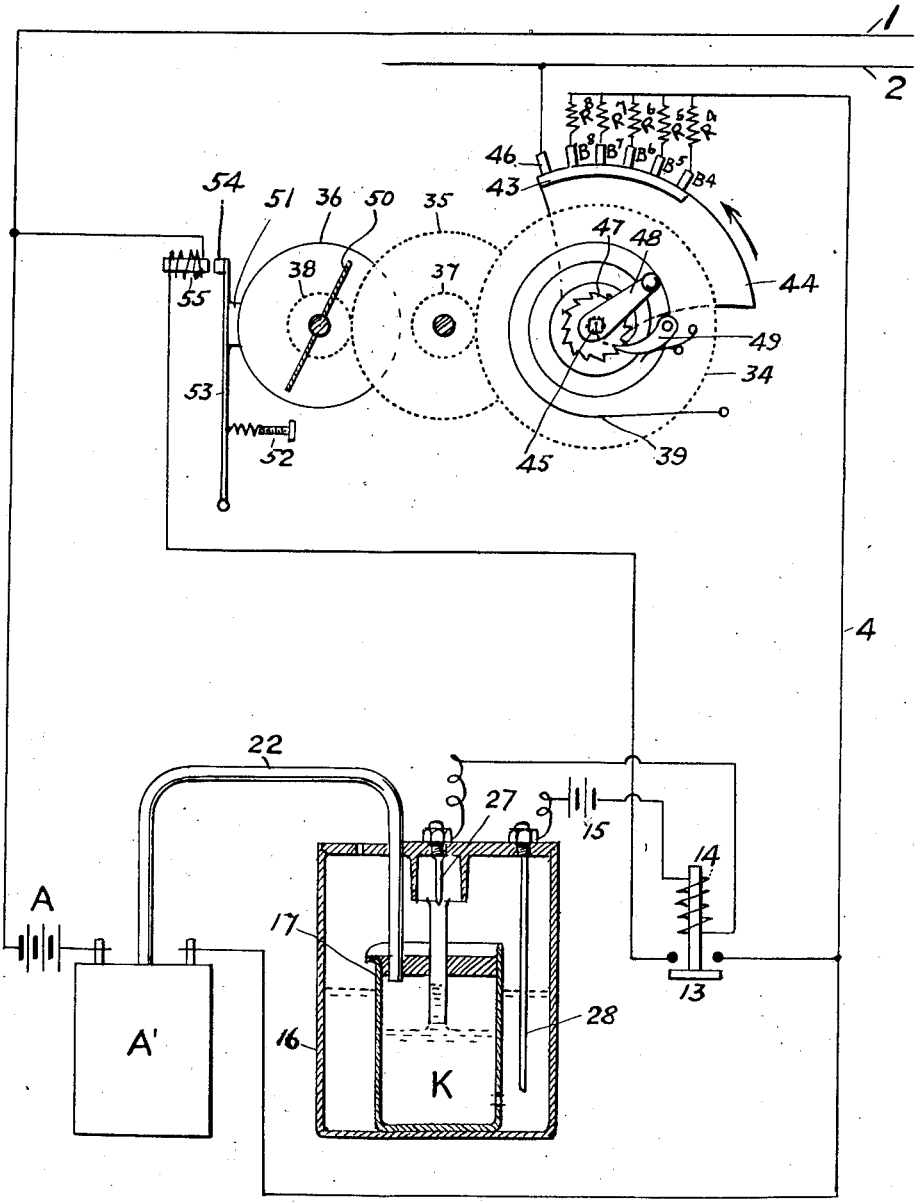
Fig. 2 is a similar view of apparatus designed to control a spring driven rheostat in the charging circuit.

In Fig. 2 is shown a modification of the apparatus illustrated in Fig. 1, in which the device responsive to gas pressure is utilized for controlling a spring driven rheostat. As in Fig. 1, the battery to be charged is shown at A, with one cell $A^1$ shown more in detail, and the battery is connected across the circuit 1—2, through a number of resistors $R^4$ to $R^8$ connected in parallel. These resistors are respectively connected to contact terminals or brushes $B^4$ to $B^8$ which bear upon a contact piece 43 mounted on an insulating sector 44 which is designed to rotate about an axis 45. A contact terminal 46 connected to conductor 2 also bears upon the contact piece 43, thus connecting battery A to the conductor 2 through conductor 4 and the resistors $R^4$ to $R^8$. Rotation of the sector 44 in the direction of the arrow will cut out the resistors $R^4$, etc., one by one as the contacts between the corresponding brushes $B^4$ $B^5$ etc., and the contact piece 43 are successively broken. The sector 44 is urged to rotate in the direction of the arrow by means of the spiral spring 39, whose inner end is attached to the axis which supports the sector. On the same axis are rigidly mounted a ratchet wheel 47 and a crank handle 48. On the same axis is also rotatably mounted a gear wheel, whose tooth pitch line is indicated by the circle 34. This gear wheel carries a pawl 49 engaging with the ratchet wheel 47, so that the sector 44 cannot be revolved by the tension of the spring 39, except by driving the gear wheel 34.

The gear wheel 34 engages a pinion 37, mounted on the same axis with another gear wheel 35, and the latter engages a pinion 38 on whose axis is also mounted a fan 50 and a brake wheel 36. A brake shoe 51 carried on an arm 53 is held against the periphery of the brake wheel 36 by means of the spring 52. The arm 53 carries at its upper end an armature 54 arranged to be attracted by the magnetic core of the solenoid 55. This solenoid is connected between conductors 1 and 4 through the contacts of the relay 13. The operation of the relay 13 is controlled by means of the gas control device K, which is identical in its construction and mode of operation with that shown in Fig. 1 and described above. When the evolution of gas in the cell $A^1$ is sufficiently rapid, the circuit will be closed in the apparatus K, energizing the relay 13 and closing its contacts. This will energize solenoid 55 which will attract the armature 54 and release the brake shoe 51 thus permitting the gear train to revolve at a speed limited by the fan 50. The sector 44 will, therefore, rotate in the direction of the arrow for a short distance until the contact in the apparatus K is opened, when the brake 51 will be applied to the wheel 36, and the motion of the gear train will be stopped. In this way the sector 44 will be moved intermittently in the direction of the arrow, gradually cutting out the resistors $R^4$ to $R^8$ the operation being controlled by the rate of evolution of gas in the cell $A^1$. When the last resistor $R^8$ is cut out of circuit, the charging of the battery will be entirely interrupted. The device may be reset for repeating the above described performance by turning the crank handle 48 to the right bringing the sector 44 back to the position shown, and rewinding the spring.

In Fig. 3 is shown a modification of the gas control apparatus shown at K in Figs. 1 and 2, but designed to be non-spillable. It consists in a vessel $K^1$, provided with a threaded projection at the bottom, designed to be screwed into the vent opening 64 of the storage cell $A^1$. The vessel $K^1$ shown in section, is made of insulating material such as hard rubber. This vessel is provided with an inner cylindrical chamber 60, closed at the top by a cover 61, and provided with a tubular extension of the bottom 62, closed at its lower end by a conducting piece 63, screwed into a threaded opening at the bottom of the tube 62 and projecting downward to make contact with the electrolyte in the cell $A^1$. Surrounding the inner chamber 60 of the vessel $K^1$, is an annular space 65, from which on the lefthand side there projects downwardly a tubular opening 66. A horizontal threaded hole 67 is shown passing across the opening 66 and into the opening 62 at the bottom of the inner chamber 60. In this hole is screwed a threaded plug 68 which has a fine hole 69 running axially, and another 70 arranged transversely and crossing the hole 69. Thus through the two holes 69 and 70 restricted communication is established between the inner chamber 60 and the external space 65.

In the cover 61 is inserted a tube 71 extending downwardly into the chamber 60 to a point just above the top of the tubular opening 62. Around the tube 71 extends an extension of the cover 61 in the form of a sleeve 72, there being a small clearance between this sleeve and the tube 71 from the lower end of the sleeve up to a point near the upper surface of the cover, beyond which point the tube 71 makes a tight fit with the cover. A horizontal hole 73 near the lower surface of the cover communicates at one end with the clearance space between the tube 71 and the sleeve 72, and at the other end with a circular groove 74 on the under side of the cover. A small duct 75 in the wall of the chamber 60 communicates at its upper end with the groove 74 and at its lower end with the space over the electrolyte in the cell A.

The vessel $K^1$ is provided with an upper cover 76, in which is mounted a conducting terminal 77, which extends downward through the cover to a point just above the upper end of the tube 71. The conducting terminal 77 is connected by conductor 80 to the coil 14 of relay 13, and thence by conductor 81 to the opposite end of the battery A. On the under side of the cover 76 is arranged a cylindrical baffle 78 surrounding the conducting terminal 77 and provided with vents 79 communicating at their lower ends with the space 65, and at their upper ends with the external atmosphere. At the bottom of the chamber 60 and of the space 65 there is a small quantity of conducting liquid such as dilute sulphuric acid.

The design is such that if the vessel $K^1$ is inverted, the liquid in the chamber 60 will be retained in the space between the cover 61, the outer wall of the chamber and the sleeve 72; and any liquid in the space 65 will be retained by the cover 76, in the space between the baffle 78 and the outer wall of the vessel $K^1$, so that no liquid can escape in whatever position the vessel $K^1$ may be placed.

The operation of the device shown in Fig. 3 is the same as that of the apparatus K in Figs. 1 and 2, the parts being somewhat differently arranged. The gas pressure developed in the cell $A^1$ as the charge progresses, will force the gas through the duct 75 and the groove 74, and thence through the passage 73 and downward through the clearance space between the tube 71 and the sleeve 72 into the inner chamber 60. This gas pressure will force the liquid in the bottom of the chamber 60 up through the tube 71, and also through the restricted vent 69 and 70 into the space 65. If the rate of gas evolution is comparatively slow, the rise of liquid in the space 65 and in the tube 71 will be substantially equal, and the total volume of liquid is such that under these conditions a sufficient amount of liquid will be forced out into the space 65 to lower the level of the liquid in the chamber 60 to a point where the column of liquid in the tube 71 will be broken at the bottom before its rises far enough to make contact with the terminal 77 at the top. If, however, the rate of gas evolution is more rapid, the restriction of flow through the vent 69 and 70 will be such as to permit the column of liquid in the tube 71 to rise to a sufficient height to make contact with the terminal 77 before the column is broken at the bottom. This will establish a circuit from the electrolyte in the cell A through the contact point 63 and the liquid in the chamber 60 and in the tube 71 via terminal 77 and conductor 80 through the coil 14 and thence via conductor 81 to the opposite terminal of battery A, thus causing current to flow through the coil 14 and actuate the relay 13. This relay may then be used to control the charging circuit of the battery as shown in Figs. 1 and 2 or in any other obvious manner. The design of the screw plug 68 is of advantage in permitting the apparatus to be adapted to control for different rates of charge. For example, if it is desired to allow the charging rate to reach a higher value before the apparatus $K^1$ acts to reduce the rate, the plug 68 may be removed and another plug substituted having the vent 69 of slightly larger diameter. It will then be necessary for the rate of gas evolution to reach a higher value before the restriction to flow in the vent 69 is sufficient to cause the column of liquid in the tube 71 to complete the circuit and operate the relay 13. On the other hand, if it is desired to control for a lower value of charging current, a plug may be used whose vent 69 has a smaller diameter thus causing the apparatus $K^1$ to respond to a slower rate of gas evolution.

It will be noted that the interruption of the circuit in the apparatus K and $K^1$ takes place in a mixture of explosive gases, oxygen and hydrogen. I have found, however, that if the reactance of this circuit is kept below a certain point and the current is kept below a certain value, there will be no danger of an explosion when this circuit is interrupted. I have found that with a coil on the relay 14 having a resistance of 12 ohms and an impedance of approximately 75 ohms at 60 cycles and requiring a current of less than 0.15 ampere to operate the relay, the apparatus can be used successfully without any danger of explosion.

Having described my invention, what I claim and desire to secure by Letters Patent is:

1. In controlling means responsive to gas pressure, the combination of two receptacles adapted to contain liquid and communicating with each other by a passage adapted for restricted flow and whereof one is provided with a vent, means for applying gas pressure to the liquid in the latter to force it through the vent, and controlling means responsive to the difference in rate of liquid flow through the vent and said restricted passage.

2. In controlling means responsive to gas pressure, the combination of two receptacles adapted to contain liquid and communicating with each other by a passage adapted for restricted flow, and whereof one has a vent, opening below the normal liquid level, means for applying gas pressure above the liquid level in the last named receptacle whereby liquid is forced through the vent and the passage, and controlling means responsive to the quantity of liquid forced through the vent.

3. In controlling means responsive to gas pressure, the combination of two receptacles adapted to contain liquid and communicating with each other by a passage adapted for restricted flow, and whereof one has a vent, said vent opening below the normal liquid level and discharging into the other, means for applying gas pressure above the liquid level in the last named receptacle whereby liquid is forced through the vent and the passage into the other receptacle, and controlling means responsive to the difference in the rate of flow through the vent and the passage.

4. In apparatus for controlling the charge of a storage battery, the combination of two liquid receptacles communicating by a passage adapted for restricted flow, a vent tube opening below the normal liquid level in one of said receptacles and discharging into the other, means for applying to the first named receptacle gas pressure developed by the evolution of gas in one of the battery cells, whereby liquid is forced from said receptacle through the restricted passage and the vent into the other receptacle, and means responsive to the difference in rate of flow through said vent and passage for controlling the battery charge.

5. In controlling apparatus responsive to gas pressure, the combination of a liquid receptacle having two outlets whereof the first is a vent adapted to permit liquid or gas to escape depending upon the liquid level and whereof the second is an orifice below the liquid level of comparatively restricted section, means for applying gas pressure above the liquid level, and controlling means responsive to the volume of liquid forced to flow through the vent by said pressure before said flow is interrupted by reduction of liquid level.

6. In apparatus for controlling the charge of a storage battery responsive to the rate of gas evolution in one of the cells, the combination of a liquid receptacle having an outlet of restricted section below the liquid level, means for applying the pressure of the gas to cause the liquid to flow through said outlet, and controlling means responsive to the retardation of flow through said outlet.

7. In apparatus for controlling the charge of a storage battery, the combination of two liquid receptacles communicating by a passage adapted for restricted flow, a vent tube opening below the normal liquid level in one of said receptacles and discharging into the other, means for applying to the first named receptacle gas pressure developed by the evolution of gas in one of the battery cells whereby liquid is forced from said receptacle through the restricted passage and the vent into the other receptacle, and means for controlling the battery charge including an electrical circuit having a contact in the liquid path of the vent tube.

8. In controlling apparatus responsive to gas pressure, the combination of two receptacles containing a conducting liquid and communicating with each other by a passage adapted for restricted flow, and whereof one has a vent, opening below the normal liquid level, means for applying gas pressure above the liquid level in the last named receptacle whereby liquid is forced through the vent and the passage, and controlling means including an electrical circuit having a contact in the liquid path of the vent.

9. In apparatus for controlling the charge of a storage battery, the combination of a receptacle containing liquid and provided with two outlets of different section, means for applying above the liquid gas pressure developed in one of the battery cells to force the liquid through the two outlets, and controlling means responsive to the difference in rate of flow through the two outlets.

10. Controlling means responsive to gas pressure and comprising the combination of a pressure chamber adapted to contain liquid and having in communication with it opposed fluid columns normally in restricted communication causing substantially equal rise of level in both columns under slowly increasing pressure and increased rise of level in one of the columns under quickly increasing pressure, and controlling apparatus responsive to such increased rise, substantially as described.

11. Controlling means responsive to gas pressure and comprising the combination of a pressure chamber adapted to contain liquid and having in communication with it opposed fluid columns in which the level rises equally under slowly increasing pressure and unequally under rapidly increasing pressure, and controlling apparatus responsive to such difference in rise, substantially as described.

12. Controlling means responsive to evolution of gas comprising a receptacle containing liquid, and having a restricted outlet below the liquid level, means for accumulating and confining gas in the receptacle above the liquid, and controlling means responsive to the difference between the rate of gas accumulation and the rate of flow through the outlet.

J. LESTER WOODBRIDGE.